No. 817,099. PATENTED APR. 3, 1906.
G. H. BENJAMIN.
METALLURGICAL FURNACE.
APPLICATION FILED SEPT. 18, 1905.

3 SHEETS—SHEET 1.

WITNESSES:
Frank O'Connor
W. H. Pumphrey

Inventor.
G. H. Benjamin

No. 817,099. PATENTED APR. 3, 1906.
G. H. BENJAMIN.
METALLURGICAL FURNACE.
APPLICATION FILED SEPT. 18, 1905.
3 SHEETS—SHEET 2.
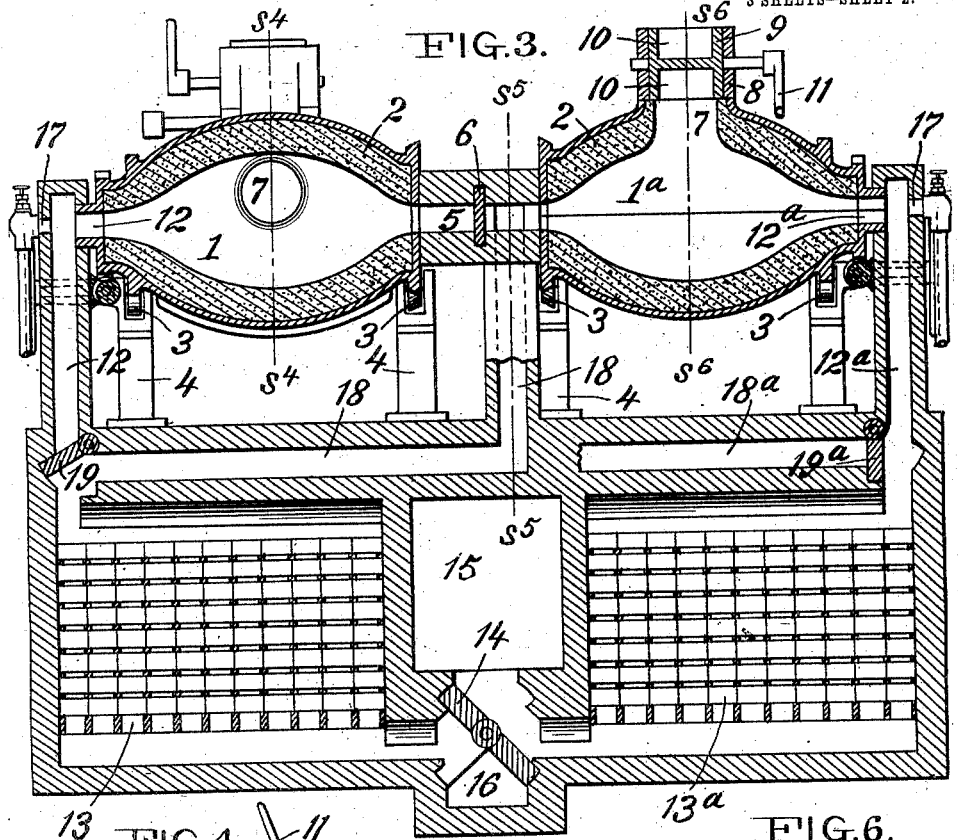
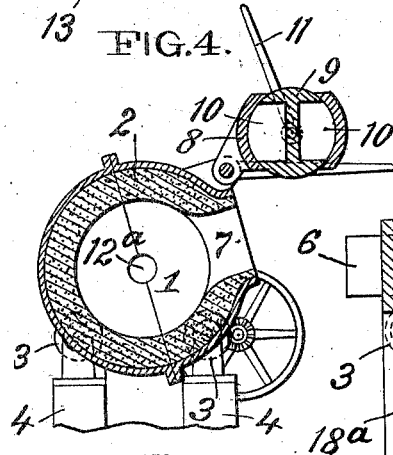
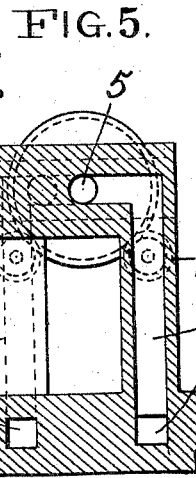
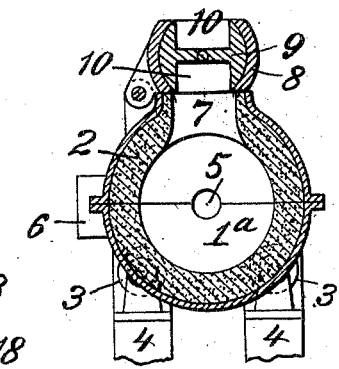
WITNESSES:
Frank O'Connor
W. H. Pumphrey
Inventor
G. H. Benjamin

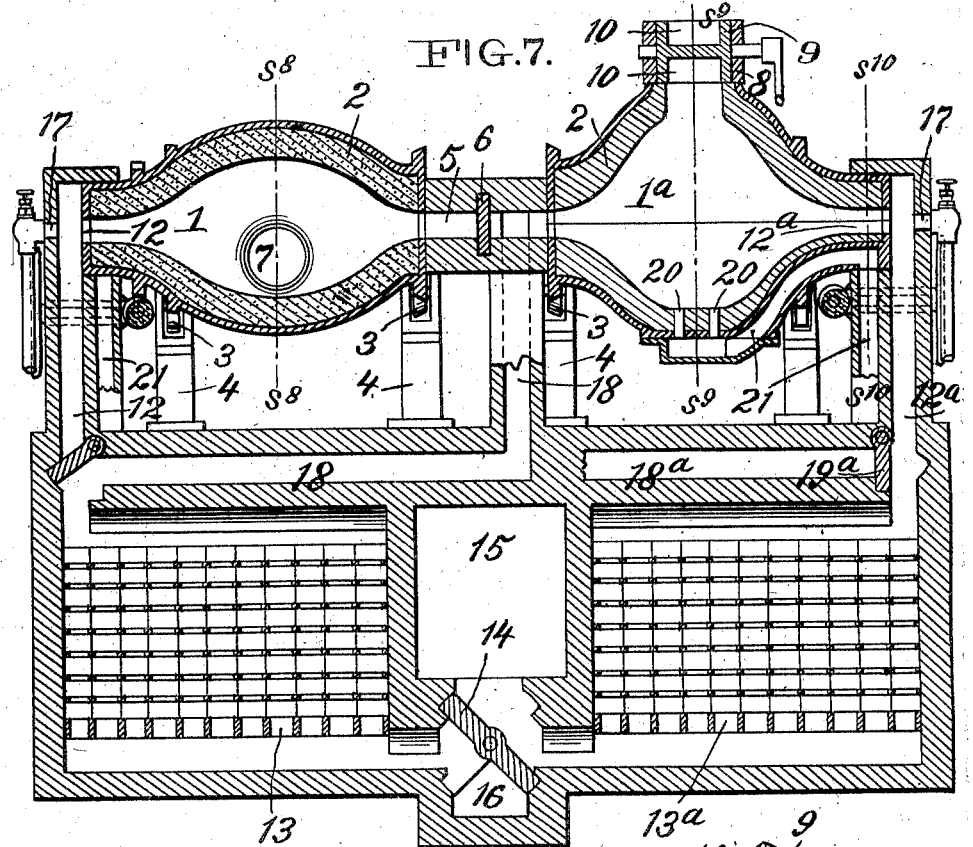
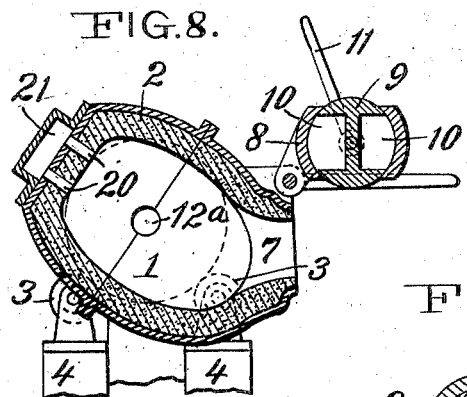
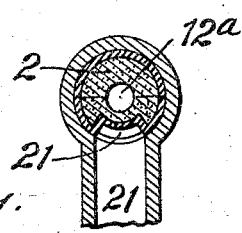
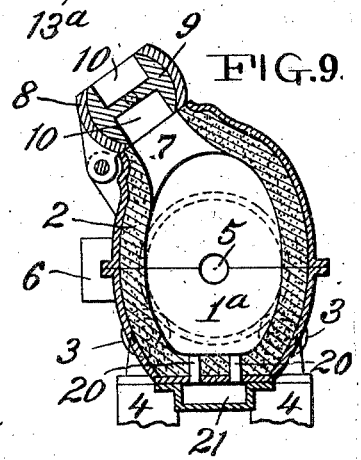

UNITED STATES PATENT OFFICE.

GEORGE HILLARD BENJAMIN, OF NEW YORK, N. Y.

METALLURGICAL FURNACE.

No. 817,099.  Specification of Letters Patent.  Patented April 3, 1906.

Application filed September 18, 1905. Serial No. 279,050.

*To all whom it may concern:*

Be it known that I, GEORGE HILLARD BENJAMIN, a citizen of the United States, residing at New York, county of New York, and State of New York, have invented certain new and useful Improvements in Metallurgical Furnaces, of which the following is a specification.

My invention relates to metallurgical furnaces, and is herein embodied as a rotary melting-furnace of the regenerative type.

The invention is designed primarily to effect a saving in fuel and increase the output of the furnace by causing the escaping products of combustion from a melting-chamber thereof heated directly by the fusing flame to pass through and heat a similar chamber before escaping by way of a regenerative chamber to the stack.

A further object of the invention is to control communication between the chambers in order that one may be emptied and recharged while the other is being heated, thus making the operation continuous.

The accompanying drawings will serve to illustrate a furnace suitable for carrying my invention into effect. I wish it understood, however, that I do not limit myself to the exact construction shown, as various changes may be made therein or the invention may be adapted to other types of furnaces operating in substantially the same manner to produce practically the same result.

Figure 1:
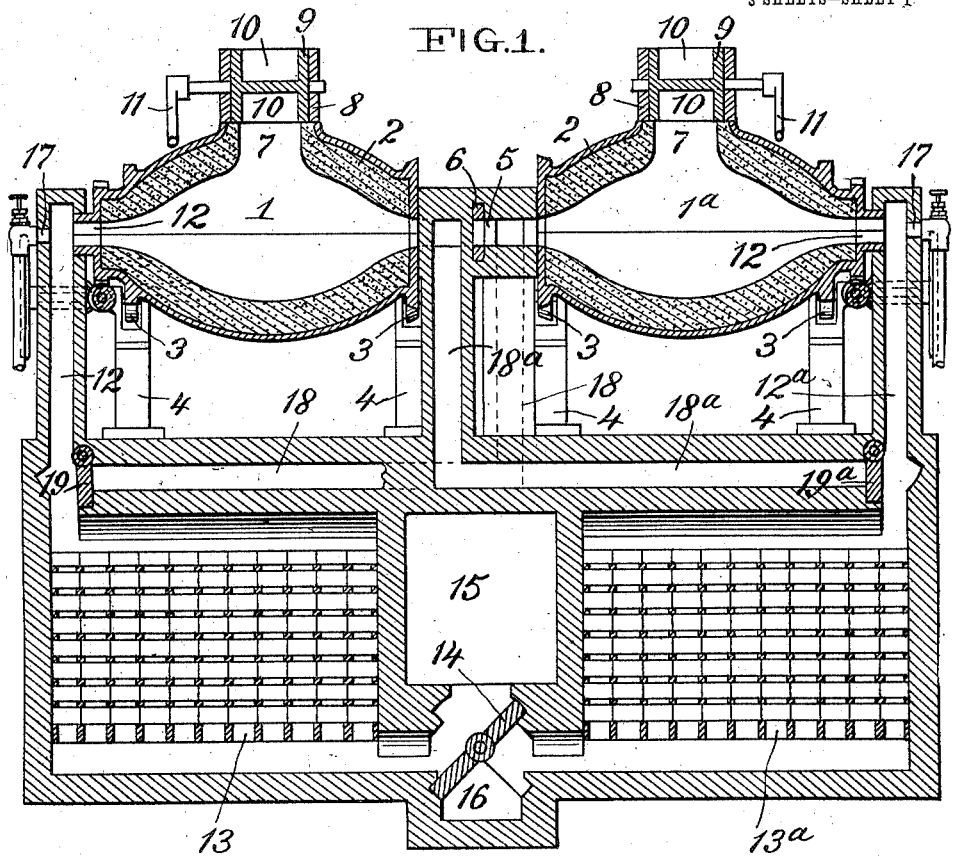
Figure 2:
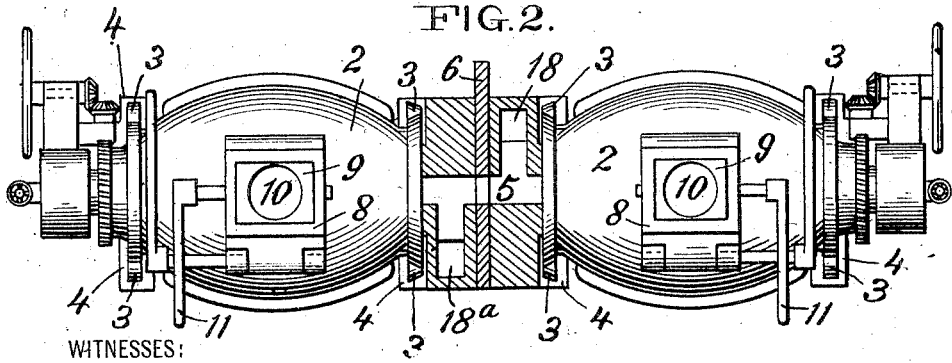

In the drawings, Figure 1 is a longitudinal section of the furnace. Fig. 2 is a plan view, partly in section. Fig. 3 is a view similar to Fig. 1, showing the valves adjusted to cut out one melting-chamber and open communication between the other and the regenerative chambers. Fig. 4 is a detail cross-section on the line $s^4 s^4$ of Fig. 3. Fig. 5 is a similar view on the line $s^5 s^5$ of Fig. 3. Fig. 6 is a sectional view on the line $s^6 s^6$ of Fig. 3. Fig. 7 is a longitudinal section showing the furnace provided with an air-blast to adapt it for use as a converter. Fig. 8 is a cross-sectional view on the line $s^8 s^8$ of Fig. 7. Fig. 9 is a similar view on the line $s^9 s^9$ of Fig. 7, and Fig. 10 is a detail section on the line $s^{10} s^{10}$ of Fig. 7.

Referring now to the drawings, the furnace shown is provided with melting-chambers 1 1$^a$, each formed within a cylindrical body or receptacle 2, which is mounted upon rollers 3 of supporting-standards 4 and adapted to be rotated by hand or power. The cylindrical bodies or receptacles 2 2 are arranged end to end and communicate through a passage 5, which may be closed when desired by a slide 6. Each of the melting-chambers is provided with a charging-opening 7, closed by a cover 8, which is hinged to be swung back clear of the same, as shown in Fig. 4, when the contained metal is being poured. The cover is designed to serve as a casing for a rotary hopper 9, which is arranged to feed metal into the melting-chamber in suitable quantities and at the same time prevent the escape of the hot gases or the entrance of air through the charging-opening thereof during the operation. The hopper 9 is preferably in the form of a cylinder, which is fitted to rotate in the cover and recessed upon opposite sides to provide pockets 10 10 to receive the metal to be fed into the melting-chamber. The hopper is rotated or oscillated to discharge the contained metal by means of a lever 11. From the outer ends of the melting-chambers flues 12 12$^a$ lead to regenerative chambers 13 13$^a$, which by means of a valve 14 may be thrown into communication with an air-supply flue 15 or a flue 16, leading to the stack or outlet for the waste products of combustion from the furnace. Opening into each of the flues 12 and 12$^a$ in line with the open ends of the melting-chambers I have shown a fuel-supply pipe 17, which may terminate in either a jet-tube or an injector, depending upon the relative pressures at which gas and air are supplied. The passage 5 between the melting-chambers is connected through flues 18 18$^a$ with the flues 12 12$^a$, and by means of valves 19 19$^a$ either or both melting-chambers may be connected in series relation with the regenerative chambers.

As shown in Fig. 1, for example, air entering by way of the flue 15 is heated in passing through the regenerative chamber 13 and combines with the gas, oil, or the like supplied by the pipe 17 to form a highly-inflammable mixture which is burned in the melting-chamber 1, heating the contained metal and passing by the only available outlet—*i. e.*, the passage 5, as the flues 18 18$^a$ are closed by the valves 19 19$^a$—into the adjoining melting-chamber 1$^a$ and thence by way of the flue 12$^a$, regenerative chamber 13$^a$, and flue 16 to the stack. Assuming, now, that the operation just described is continued until the metal in the chamber 1 has reached the fusing-point and is ready to be poured into molds or other suitable receptacles, the passage 5 is closed by the slide 6, and the valves 14 and 19 are shifted from the position shown in Fig. 1 to that shown in Fig. 3, the result being that communication between the chamber 1 and the other chambers is cut off, while the chamber 1ª is connected in series relation with the regenerative chambers, and by now cutting off the fuel-supply from the burner at the left and starting up the burner at the right air from the flue 15, passing through the regenerative chamber 13ª and flue 12ª, will combine with the supply of gas or oil for the fusing-flame in the chamber 1ª, and the escaping products of combustion will pass therefrom by way of the flue 18 through the regenerative chamber 13 and flue 16 to the stack. The required adjustment of the valves for cutting out the chamber 1ª and connecting the chamber 1 with the regenerative chambers will be apparent from the foregoing description.

The furnace, as above described, is adapted particularly for melting copper or other metals; but it may obviously be employed for other purposes, if desired. In Figs. 7 to 10, for example, I have shown the receptacles 2 2 shaped and provided with twyers 20 to serve as converters suitable for treating iron or copper. The air-blast employed may be hot or cold and accordingly supplied either through the regenerative chambers and flues 21, leading therefrom to the twyers, or from the source of supply directly to such flues. I have shown the twyers located in the bottom of the chamber; but it will be understood that they may be arranged in the sides thereof, if preferred.

The operation, advantages, &c., of my invention will be apparent from the foregoing description.

Having thus described my invention, I claim—

1. A furnace comprising a plurality of rotatable receptacles, regenerative chambers coöperating therewith, and means for connecting one or more of the receptacles in series relation with the regenerative chambers.

2. A furnace comprising a plurality of rotatable receptacles, regenerative chambers coöperating therewith, and means for closing communication between one or more of the receptacles and the regenerative chambers.

3. A furnace comprising a plurality of rotatable receptacles provided with requisite inlets and outlets, regenerative chambers common to the several receptacles, and means for opening and closing communication between one or more of the receptacles and the regenerative chambers.

4. A furnace comprising a plurality of receptacles arranged end to end and independently rotatable, coöperating regenerative chambers, and requisite flues and valves for connecting one or more of the receptacles in series relation with the regenerative chambers.

5. A furnace comprising a plurality of rotary receptacles arranged end to end and each provided with a valved charging-opening, coöperating regenerative chambers, requisite flues leading to and from the regenerative chambers, and controlling-valves for connecting one or more of the receptacles in series relation with the regenerative chambers.

6. A furnace comprising a plurality of rotary receptacles arranged end to end and communicating through a valved passage, coöperating regenerative chambers, flues leading from the ends of said receptacles to the regenerative chambers, and valves controlling the flues.

7. A furnace comprising a plurality of rotatable receptacles, means for heating the receptacles, coöperating regenerative chambers, and means for connecting one or more of the receptacles in series relation with the regenerative chambers.

8. A furnace comprising a plurality of communicating receptacles mounted to be rotated independently of each other, means for heating the receptacles, coöperating regenerative chambers, and means for connecting the receptacles individually in series relation with the regenerative chambers.

9. A furnace comprising a plurality of rotatable receptacles, means for heating the receptacles, means for feeding material into said receptacles while maintaining the same effectively closed against the escape of gas therefrom, regenerative chambers coöperating with said receptacles, and means for connecting one or more of the receptacles in series relation with the regenerative chambers.

10. A furnace comprising a plurality of rotatable receptacles, means for heating the receptacles, means for holding material to be charged into said receptacles, regenerative chambers coöperating with said receptacles, and means for connecting one or more of the receptacles in series relation with the regenerative chambers.

In testimony whereof I affix my signature in the presence of two witnesses.

GEORGE HILLARD BENJAMIN.

Witnesses:
FRANK O'CONNOR,
M. G. CRAWFORD.